US011941351B2

(12) United States Patent
Collinson et al.

(10) Patent No.: US 11,941,351 B2
(45) Date of Patent: Mar. 26, 2024

(54) DYNAMIC USER INTERFACE CONTROL SYSTEM

(71) Applicant: The Toronto-Dominion Bank, Toronto (CA)

(72) Inventors: John Michael Collinson, Kitchener (CA); Christopher William Cooney, Toronto (CA); Russell Voutour, Toronto (CA); Marie-Julie Demers, Saint-Lambert (CA); Arun Victor Jagga, Toronto (CA); John Jong-Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 396 days.

(21) Appl. No.: 16/996,156

(22) Filed: Aug. 18, 2020

(65) Prior Publication Data

US 2020/0380201 A1 Dec. 3, 2020

Related U.S. Application Data

(63) Continuation of application No. 16/143,660, filed on Sep. 27, 2018, now Pat. No. 11,068,645.

(51) Int. Cl.
*G06F 40/174* (2020.01)
*G06F 3/0481* (2022.01)
(Continued)

(52) U.S. Cl.
CPC .......... *G06F 40/174* (2020.01); *G06F 3/0481* (2013.01); *G06F 9/451* (2018.02); *G06F 40/103* (2020.01)

(58) Field of Classification Search
None
See application file for complete search history.

(56) References Cited

U.S. PATENT DOCUMENTS 7,698,628 B2 4/2010 Perelman et al.
8,024,660 B1 * 9/2011 Quinn ................. G06F 11/3438
715/745
(Continued)

OTHER PUBLICATIONS

Schlungbaum, "Individual user interfaces and model-based user interface software tools" IUI '97: Proceedings of the 2nd international conference on Intelligent user interfaces, Jan. 1997, pp. 229-232. (Year: 1997).*

(Continued)

*Primary Examiner* — Amelia L Tapp
(74) *Attorney, Agent, or Firm* — Rowand LLP (57) ABSTRACT

Methods and systems for providing a graphical user interface to a computing device are described. In one aspect, a method includes: providing a first portion of the graphical user interface to the computing device, the first portion of the graphical user interface including an interface element for receiving input through an input interface associated with the computing device; receiving input received at the interface element; determining an eligibility metric based on the input; comparing the eligibility metric to eligibility criteria to determine if a user is likely eligible for a service; and when it is determined that the user is not likely to be eligible for the service, providing, to the computing device, a second portion of the graphical user interface, the second portion of the graphical user interface having a greater completion complexity than a third portion of the graphical user interface, the third portion of the graphical user interface being provided when it is determined that the user is likely to be eligible for the service.

20 Claims, 4 Drawing Sheets

(51) Int. Cl.
*G06F 9/451* (2018.01)
*G06F 40/103* (2020.01)

(56) References Cited

U.S. PATENT DOCUMENTS

| | | | |
|---|---|---|---|
| 8,095,476 B2 | 1/2012 | Bierner et al. | |
| 8,869,286 B1* | 10/2014 | Liu | H04L 63/1433 |
| | | | 726/25 |
| 9,405,426 B2 | 8/2016 | Tanaka | |
| 2003/0004738 A1 | 1/2003 | Chandar | |
| 2006/0107224 A1 | 5/2006 | Friend et al. | |
| 2007/0244808 A1* | 10/2007 | Eze | G06Q 40/03 |
| | | | 705/38 |
| 2008/0215976 A1* | 9/2008 | Bierner | G06Q 99/00 |
| | | | 715/708 |
| 2009/0037378 A1 | 2/2009 | Moor et al. | |
| 2012/0084075 A1 | 4/2012 | Yamada et al. | |
| 2014/0372269 A1 | 12/2014 | Ternan et al. | |
| 2015/0294420 A1 | 10/2015 | Hu | |
| 2016/0070917 A1 | 3/2016 | Rozenberg et al. | |
| 2016/0314110 A1* | 10/2016 | Corcoran | G06F 40/174 |
| 2017/0083672 A1 | 3/2017 | Juneau et al. | |
| 2018/0210870 A1 | 7/2018 | Jain et al. | |
| 2020/0005417 A1* | 1/2020 | Agasi | G06F 40/174 |

OTHER PUBLICATIONS

Ying et al., "Refactoring Traditional Forms into Ajax-enabled Forms" 2011 18th Working Conference on Reverse Engineering, copyright 2011 IEEE, pp. 367-371. (Year: 2011).*
CA Office Action, Application No. 3,018,887—dated Sep. 2, 2021 dated Sep. 2, 2021.
USPTO, Office Action relating to U.S. Appl. No. 16/143,660 dated Nov. 20, 2019.
USPTO, Final Office Action relating to U.S. Appl. No. 16/143,660 dated Apr. 13, 2020.

* cited by examiner

DYNAMIC USER INTERFACE CONTROL SYSTEM

CROSS-REFERENCE TO RELATED APPLICATIONS

This application is a continuation of U.S. patent application Ser. No. 16/143,660 filed on Sep. 27, 2018, the entirety of which is incorporated herein by reference.

FIELD

The present application generally relates to dynamic control of a user interface associated with a computing device and, more particularly, to controlling user interfaces to selectively increase or decrease a completion complexity associated with such user interfaces to indirectly control the use of computing resources.

BACKGROUND

Internet servers sometimes allow for the receipt of documents from a number of different users. Some such systems may have little or no control over the timing at which documents may be submitted. For example, there may be periods during which no documents are received and there may be other periods when a large volume of documents are received. Often, system infrastructure is designed to accommodate document submission spikes. Designing systems capable of accommodating such spikes, however, requires systems that have relatively high bandwidth, processing power, memory, etc., and such systems can be costly and may use a great deal of energy to operate. Furthermore, even when systems are designed to accommodate document submission spikes, an atypical spike may occur that exceeds capacity.

For example, document submission spikes may occur in a system that is configured to process insurance documents, such as insurance applications, received from remote computing devices. The time of day may affect the number of documents that are submitted or a notable current event, such as a celebrity death, may result in a rapid rise in the number of insurance documents being submitted to an insurance processing system.

Insurance processing systems also suffer from other computing resource problems apart from those caused by submission spikes. For example, each electronic document that is received consumes computing resources since each document occupies computer memory to store information associated with such documents. A significant volume of applications received over a lengthy period of time may occupy a significant amount of memory. For example, electronic insurance applications may be continually stored in memory while insurance is in force since inaccuracies on the insurance application may affect future claims. Given the importance of such documents, storage may be redundant, meaning that each application may be stored multiple times and each application may, therefore, consume computing memory resources that may be many multiples of the size of the electronic application.

Over time the storage burden may become increasingly onerous and, as time elapses it may become increasingly difficult to identify items that may be purged from memory.

There is a need for improving the use of computing resources for electronic document processing systems.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In a first aspect, the present application may describe a server to provide a graphical user interface to a computing device. The server includes a processor and a communication system coupled to the processor for communicating over a network with the computing device. The server further includes memory coupled to the processor. The memory stores processor-readable instructions that, when executed, cause the processor to: provide, via the communication system and to the computing device, a first portion of the graphical user interface, the first portion of the graphical user interface including an interface element for receiving input through an input interface associated with the computing device; receive, via the communication system, input received at the interface element; determine an eligibility metric based on the input; compare the eligibility metric to eligibility criteria; and when the eligibility metric does not satisfy the eligibility criteria, provide, to the computing device via the communication system, a second portion of the graphical user interface, the second portion of the graphical user interface having a greater completion complexity than a third portion of the graphical user interface, the third portion of the graphical user interface being provided when the eligibility metric satisfies the eligibility criteria.

In another aspect, the present application may describe s method of providing a graphical user interface to a computing device. The method may include: providing a first portion of the graphical user interface to the computing device, the first portion of the graphical user interface including an interface element for receiving input through an input interface associated with the computing device; receiving input received at the interface element; determining an eligibility metric based on the input; comparing the eligibility metric to eligibility criteria; and when the eligibility metric does not satisfy the eligibility criteria, providing, to the computing device, a second portion of the graphical user interface, the second portion of the graphical user interface having a greater completion complexity than a third portion of the graphical user interface, the third portion of the graphical user interface being provided when the eligibility metric satisfies the eligibility criteria.

In yet a further aspect, the present application may describe non-transitory computer-readable media storing computer-executable program instructions which, when executed, configure a processor to perform one or more of the described methods. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In at least some aspects, the present disclosure describes techniques for indirectly controlling the use of system resources associated with a back-end computing system, such as a server, by varying a graphical user interface (GUI) that is configured to interact with the back-end computing system. More specifically, a graphical user interface that is used to submit data to a server may be selectively modified to make submission easier or more difficult. For example, as data that was received as input at a remote computing device is being submitted to the server, the server may evaluate the data to determine an eligibility metric. The eligibility metric may be a measure of the likelihood of a user being eligible for a service, such as insurance. The eligibility metric may, for example, be a score.

The server may compare the eligibility metric to predefined eligibility criteria and may modify the graphical user interface to make submission more complex based on the comparison. For example, when the eligibility metric suggests a likelihood of ineligibility, the server may automatically provide a relatively complex version of the graphical user interface. The relatively complex version of the graphical user interface is a version of the graphical user interface that is more complex than a version of the graphical user interface that is provided when the eligibility metric does not suggest ineligibility. The complex version of the GUI is an artificially complex version of the graphical user interface that is used to either slow down submission or to increase the abandonment rate of submissions to reduce the use of computing resources.

The complex version of the GUI may be used, for example, to manage bandwidth and other computing resources when there is a spike (e.g., a rapid increase) in application submission. Some users may be provided with the non-complex version of the GUI and others may be provided with the complex version of the GUI. The complex version of the GUI may take longer to complete than the non-complex version of the GUI and may have a higher drop-off rate. The complex version of the GUI may be used to effectively manage the time at which submissions through the GUI are expected to be received or to manage the number of submissions through the GUI that are expected to be received. For example, the complex version of the GUI may allow at least some of the submissions to be received after the spike in application volume has ended.

The complex version of the GUI may use various techniques that make it more complex than the less complex version of the GUI. For example, the complex version of the GUI may include a false interface element whereas the less complex version of the GUI may not include the false interface element. This false interface element may also be referred to as a dummy interface element and may be an interface element that prompts for input which, once received, is not used. For example, the input may not be sent to the server or may not be used by the server and may, instead, be disposed of.

The complex version of the GUI may increase complexity by disabling an auto-completion feature which is enabled on the less complex version of the GUI. The auto-completion feature may allow certain fields to be automatically populated with input. For example, the auto-completion feature may allow fields that receive identification information (e.g., a name, address, date of birth, gender, email address, telephone number, etc.) to be automatically populated with previously stored identification information. The previously stored identification information is information that was previously input by a past user of a computing device that is displaying the GUI. By disabling the auto-completion feature, the user is required to manually input more information than if the auto-completion feature were enabled, making input more complex and slowing down entry.

The complex version of the GUI may, in at least some embodiments, increase complexity by enforcing a formatting restriction that is not enforced on the less complex version of the GUI. The formatting restriction may, for example, be a date formatting restriction, a numerical formatting restriction, a name formatting restriction, a currency formatting restriction, or a formatting restriction of another type. By way of example, the GUI may include a "date of birth" field, or a field which requests a date of another type and the complex version of the GUI may require the date to be input in a single format (e.g., MM-DD-YYYY) whereas the less-complex version may allow for input with a greater number of formats.

By way of further example, the formatting restriction may be a name formatting restriction which requires an inputted name to accord to a predetermined format. For example, the complex version of the GUI may require a first name to be input prior to a last name and may generate an error when a last name is input first, whereas the less-complex version of the GUI may allow for input of last name first and may recognize last name first formatting when a comma is used in a name field.

The complex version of the GUI may, in at least some embodiments, increase complexity through the use of font size. For example, both versions of the GUI may include some common text and the font size of at least a portion of the common text may be different on the complex version of the GUI than on the non-complex version of the GUI. For example, the font for such text on the complex version may be one that is relatively more difficult to read than the font on the non-complex version. For example, the font on the complex version may be a higher font size; for example, a font that does not fit well on the page. By way of further example, the font on the complex version may be a smaller font size; for example, one that is difficult to read.

The complex version of the GUI may, in at least some embodiments, override a preference, such as a browser preference, that is not overridden by the non-complex version of the GUI. For example, the non-complex version of the GUI may use a default font size for the browser, whereas the complex version may override the default font size (e.g., by specifying an absolute size or by specifying a relative font size that is greater than or less than the default font size).

The non-complex version of the GUI may, in at least some embodiments, include completion instructions that are not immediately provided on the complex version of the GUI. The completion instructions may, for example, specify a formatting restriction. For example, the GUI may include a field that requires data to be input in a particular format and the non-complex version may display the formatting restriction to the user when the field is displayed. The complex version may include the same field and may enforce the same formatting restriction for that field but may not display the formatting restriction to the user when the field is displayed. Instead, the complex version may generate an error when a user attempts to submit a completed form. The error may display the formatting restriction to the user.

The complex version of the GUI may, in at least some embodiments, include content that is unnecessarily verbose. For example, the complex version may include text that is similar in content to text included in the non-complex version but which has a higher word count than the text included in the non-complex version.

Conveniently, in obtaining an eligibility metric based on a partially-submitted electronic application and using the eligibility metric to selectively provide a complex or non-complex version of a graphical user interface, a server is provided with some control over the use of computing resources. Further, since the eligibility metric is evaluated against eligibility criteria, computing resources may be dynamically managed by adjusting the eligibility criteria in response to changes in network conditions. For example, during periods of peak usage, the eligibility criteria may be automatically adjusted by the server to increase the number of computing devices that will receive the complex version of the GUI thereby delaying at least some submissions or decreasing a submission rate. Later, when network conditions return to normal, the eligibility criteria may be re-adjusted.

Figure 1:
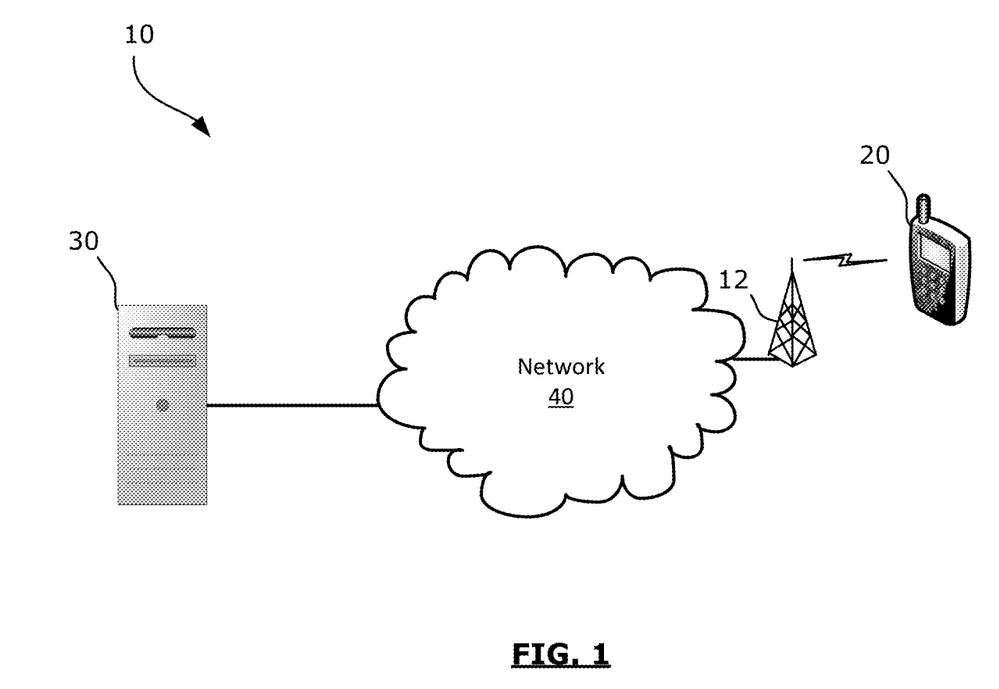
FIG. 1 diagrammatically shows an example system.

Reference is now made to FIG. 1, which shows an example system 10. The system 10 includes a remote computing device 20 and a server 30. The server is configured to provide a graphical user interface to the remote computing device and the server may be a web server.

The server 30 and remote computing device 20 are configured to communicate digitally over one or more networks 40, which may include public networks (e.g. the Internet), private networks, VPNs, wired networks, wireless networks, and combinations thereof. The server 30 may be implemented using one or more computing devices having processing resources and memory resources, being configured to receive and respond to requests from computing devices.

The remote computing device 20 may, in some embodiments, be a personal computer such as a laptop or desktop computer. In some embodiments, it is a mobile device, such as a smartphone, tablet, phablet, smartwatch, or combination thereof.

Figure 2:
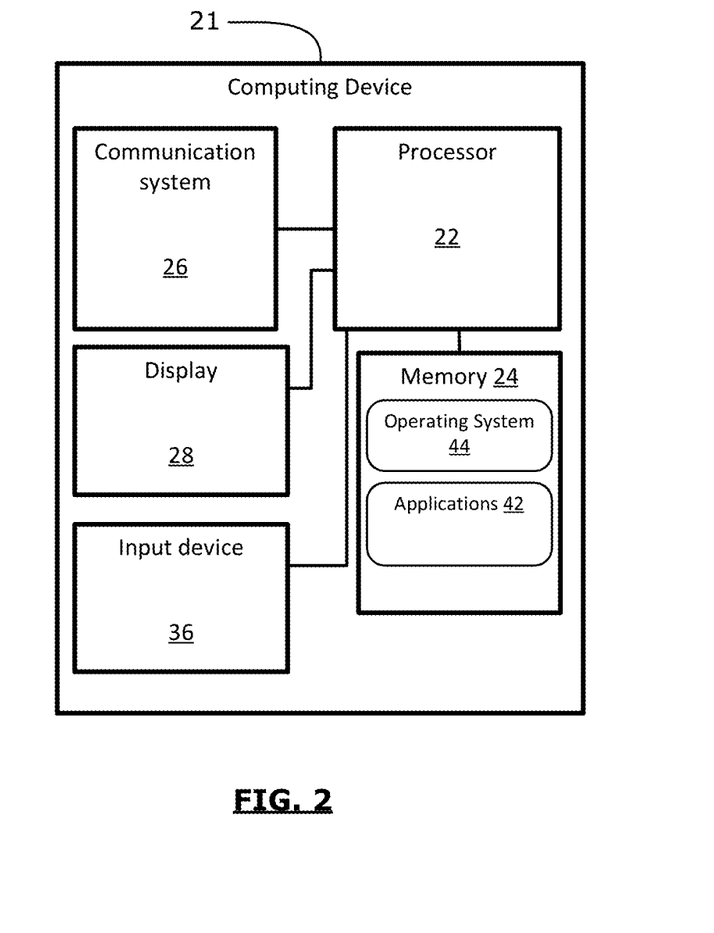
FIG. 2 is a block diagram illustrating components of an example computing device.

The server 30 and remote computing device 20 are both computing devices and an example computing device 21 will now be described with reference to FIG. 2.

The computing device 21 includes at least one processor 22, memory 24 and a communication system 26. The communication system 26 may include subsystems for wired or wireless data communication and wired or wireless voice communication. In some examples of the computing device 21 which may be used, for example, with the remote computing device 20 of FIG. 1, the communication system 26 includes a subsystem for cellular data and voice connectivity via a cellular system 12. The cellular system 12 may include a system operating in accordance with one or more of a variety of cellular voice and data protocols for connectivity and communication, including 5G, 4G and 3G systems. The communication system 26 may further include a subsystem for wireless local area network (WLAN) connectivity with an access point, which may operating in accordance with the IEEE 802.11 protocol, for example. The communication system 26 may provide the computing device 21 with other wired or wireless connections for accessing the networks 40.

The computing device 21 may include a display 28 and/or one or more input interfaces associated with one or more input devices 36. The input devices 36 may include a touch sensitive overlay on the display 28 for detecting touch-based input, for example. Other examples of the input device 36 may include a keyboard, keypad, touchpad, motion sensor such as a gyroscope or accelerometer, mouse, microphone, keyboard with touch-sensitive surface, or various buttons. In some cases, the input device 36 includes a port or other communication path for receiving input via an external peripheral device, such as a mouse, keyboard, wand, pen, smartphone, smartwatch, etc.

The memory 24 may include volatile and non-volatile memory. At least a part of the memory 24 may store processor-readable instructions that, when executed by the processor, cause the processor to carry out some of the operations described herein. The processor-readable instructions stored in memory 24 may include an operating system 44 that implements basic device functions and creates a run-time environment within which other software is executed. The memory 24 may also store a plurality of applications 42, where the term "application" refers to a set of program-executable instructions that configure or adapt the processor 22 to carry out a particular algorithm or set of steps or operations. Example applications 42 may include a messaging application, a word processing application, a calculator, a calendar, a music library, a social media application, or other such applications. The nature of the applications 42 will depend on whether the computing device 21 is the server 30 or the remote computing device 20. For example, the remote computing device 20 may include an application 42, such as a browser, that is configured to enable functions of methods described herein as being performed by the remote computing device 20. Such functions may include the capability to render a GUI on the display 28 based on data received from the server 30 and the ability to receive input to allow a user to interact with the GUI, the ability to provide auto-completion functions for populating one or more fields of a form based on stored data and other functions such as those generally described herein.

A computing device 21 that is the server 30 may include an application 42, which may be referred to as a GUI manager, which may enable the server 30 to perform server functions as generally described herein. For example, such functions may include the ability to cause the GUI to be rendered on a display 28 of the remote computing device 21 (e.g., by serving the GUI to the remote computing device 21), the ability to dynamically modify the GUI to manage computing resources, and other functions such as those generally described herein.

Figure 3:
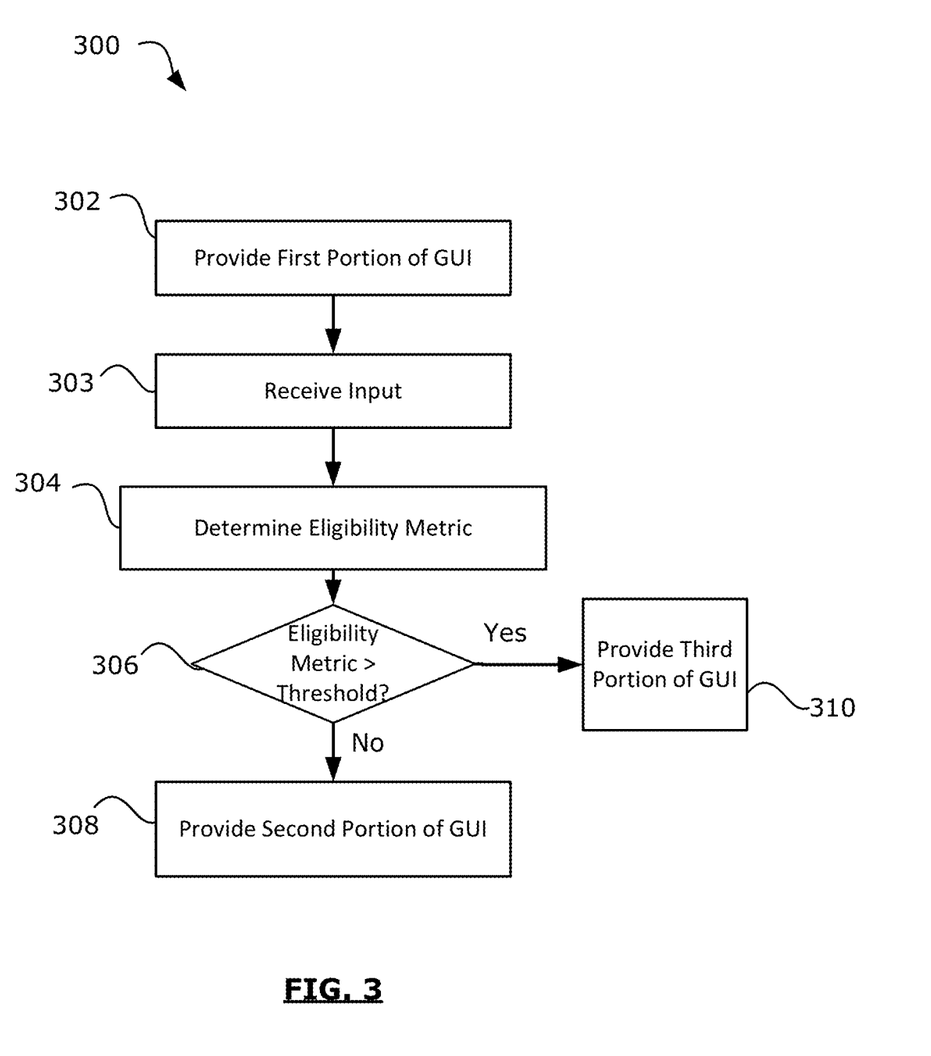
FIG. 3 shows, in flowchart form, a method for providing a graphical user interface.

Reference is now made to FIG. 3, which shows, in flowchart form, an example method 300 of providing a graphical user interface to a computing device. In this example method 300, the described operations are carried out by the server 30 (FIG. 1) and involve interactions with the remote computing device 20. The method 300 may be implemented, at least in part, through processor-executable instructions in an application 42, such as the GUI manager, although in some other embodiments one or more of the operations is implemented via processor-executable instructions in another application 42 or in the operating system 44.

At operation 302, the server 30 provides a first portion of the graphical user interface to the remote computing device 20. The first portion of the graphical user interface may be provided as a web page. For example, the remote computing device 20 may request the web page (e.g., using an HTTP GET) and the server 30 may then provide the web page through a communication system of the server. The web page includes interface elements for receiving input through an input interface associated with the remote computing device 20. The interface elements may be a displayed interactive feature that allows for receipt of input through a suitable input device, such as a keyboard, touchscreen, microphone, etc.

By way of example, the first portion of the GUI may include a form. The form may include one or more fields through which input may be received. By way of example, the fields may prompt a user for input of information of a certain type. For example, the form may prompt the user for input of a claims history, identification information such as a name, address, date of birth, contact information, medical history, etc.

A user of the remote computing device 20 may populate an interface element, such as a field by interacting with the input device associated with the remote computing device. For example, in at least some embodiments, a user may interact with a keyboard to input a text-based input into a field. By way of further example, in some embodiments, a user may use an auto-completion feature. The auto-completion feature may allow one or more interface elements (e.g., fields) to be automatically populated based on input provided in similar interface elements in a prior session. For example, a name field may be automatically populated with a name that was entered into a form previously on the remote computing device 20.

Input may be received at the interface element and may be sent to the server 30 from the remote computing device 20. For example, the remote computing device 20 may send the input using an HTTP POST upon receipt of suitable input, such as activation of a "save", "send" or "submit" interface element.

At operation 303, the server 30 receives the input that was received at the remote computing device 20 through the interface element. The server 30 may receive the input through the communication system.

In response to receiving the input, the server 30 may determine an eligibility metric based on the input. The eligibility metric is determined based on one or more predefined rules or scores, which may be stored in memory associated with the server 30. For example, the eligibility metric may be determined as a score that is based on a plurality of inputs received from through the GUI. For example, certain responses may have certain numerical values associated therewith and a higher (or lower as the case may be) value may indicate a preferred response. For example, a user with no claims history may receive a score of 10 for this component, whereas a user with a single claim may receive a score of 8 and a user with five claims may receive a score of 0.

In at least some embodiments, at operation 304 the server 30 may use a plurality of inputs to determine the eligibility metric. For example, inputs received through multiple fields of the GUI may be evaluated to generate a score. The score may, for example, be generate as a weighted average of scores associated with individual inputs, although other techniques may also be used. The eligibility metric indicates a relative likelihood of a user being eligible for a service.

At operation 306, the server 30 compares the eligibility metric to predefined eligibility criteria. The eligibility criteria may be stored in memory of the server 30 and may, for example, be a threshold, or a rule. For example, the comparison at operation 306 may evaluate whether the eligibility metric is greater than or less than a threshold.

When the eligibility metric does not satisfy the eligibility criteria, control flow proceeds to operation 308 where the server 30 provides to the remote computing device 20, via the communication system, a second portion of the GUI. When the eligibility metric does satisfy the eligibility criteria, control flow proceeds to operation 310 where the server 30 provides to the remote computing device 20, via the communication system, a third portion of the GUI.

The third portion of the GUI and the second portion of the GUI are different. More specifically, the second portion of the GUI has a greater completion complexity than the third portion of the GUI. That is, the second portion of the GUI is the complex version of the GUI and the third portion of the GUI is the non-complex version of the GUI.

As noted above, the second portion of the GUI (i.e., the complex version of the GUI) may differ from the third portion of the GUI (i.e., the non-complex version) in various aspects. For example, the second portion of the graphical user interface may include a false interface element whereas the third portion of the GUI does not include false interface elements. A false interface element may prompt for input that, once received, is not stored or used by the server. That is, input that is received at the false interface element may simply be discarded and may not be used, for example, in evaluating an application or form represented by the GUI. The false interface element only serves to make completion of the form or application more complicated.

By way of further example, the second portion of the graphical user interface (i.e., the complex version) may be configured to disable an auto-completion function on the computing device whereas the third portion of the graphical user interface (i.e., the non-complex version) may not disable the auto-completion function. That is, the third portion of the GUI may be configured to enable the auto-completion function on the computing device.

By way of further example, the second portion of the graphical user interface may impose a formatting restriction that is not imposed by the third portion of the graphical user interface. For example, the second portion of the GUI may include an interface element for receiving a first type of information and the third portion of the graphical user interface may also include an interface element for receiving the first type of information. However, the interface element of the second portion of the graphical user interface may impose a format restriction that is not enforced by the corresponding interface element of the third portion of the graphical user interface. For example, the formatting restriction may be a date formatting restriction that requires an inputted date to accord to a predetermined format, a name formatting restriction that requires an inputted name to accord to a predetermined format, a numerical formatting restriction, an address formatting restriction such as a postal code formatting restriction, a contact information formatting restriction such as a telephone number formatting restriction, or a formatting restriction of another type.

In some instances, the second portion of the GUI (i.e., the complex version of the GUI) may differ from the third portion of the GUI (i.e., the non-complex version) in that the second portion of the GUI does not provide completion instructions that are provided on the third portion of the GUI. For example, the GUI may have completion requirements (e.g., may require completion of certain fields or may enforce formatting restrictions in certain fields) and the complex version of the document may not inform the user about such completion requirements when fields associated with such completion requirements are displayed while the non-complex version may inform the user about such completion requirements while such fields are displayed. The complex version may only inform the user of the completion requirements after the user attempts to submit the form or application represented by the GUI, requiring the user to engage in a trial and error process in order to complete the form or application.

In some embodiments, the second portion of the graphical user interface (i.e., the complex version) and the third portion of the graphical user interface (i.e., the non-complex version) may both include at least some common text but the font size of at least a portion of the common text may be different on the second portion of the graphical user interface than on the third portion of the graphical user interface. More specifically, the second portion of the GUI may include a font that is poorly sized. For example, the non-complex version of the GUI may use a default font size for the browser, whereas the complex version may override the default font size (e.g., by specifying an absolute size or by specifying a relative font size that is greater than or less than the default font size).

In some instances, the second portion of the GUI (i.e., the complex version of the GUI) may differ from the third portion of the GUI (i.e., the non-complex version) in that the second portion of the GUI includes text that is similar in content to text included in the third portion of the GUI but which has a higher word count than the text included in the third portion of the GUI. That is, the second portion of the GUI may be a verbose version of the GUI.

In some instances, the second portion of the GUI (i.e., the complex version of the GUI) and the third portion of the GUI (i.e., the non-complex version) may include the same (non-dummy) interface elements. That is, both portions of the GUI may obtain the same information but may simply do so in a different way.

Conveniently, since the server 30 is a computing device, it may evaluate the inputs received from the remote computing device 20 in real time so that the subsequent portion of the GUI can be provided instantly. That is, the determination may be made on-the-fly and unbeknownst to the user. The GUI can be made to operate without lag due to the real-time evaluation of the input by the server.

The techniques described herein may be used, for example, to dynamically respond to congestion in a network or the server 30. For example, the server 30 may monitor traffic and may modify the eligibility criteria to dynamically control a computing resource associated with the server 30. For example, when traffic increases, the eligibility criteria may be made more onerous so that a greater number of remote computing devices receive the relatively complex version of the GUI. Where the eligibility criteria is a threshold, this may be done by simply adjusting the threshold. Later, when traffic slows, the eligibility criteria may be re-adjusted.

Figure 4:
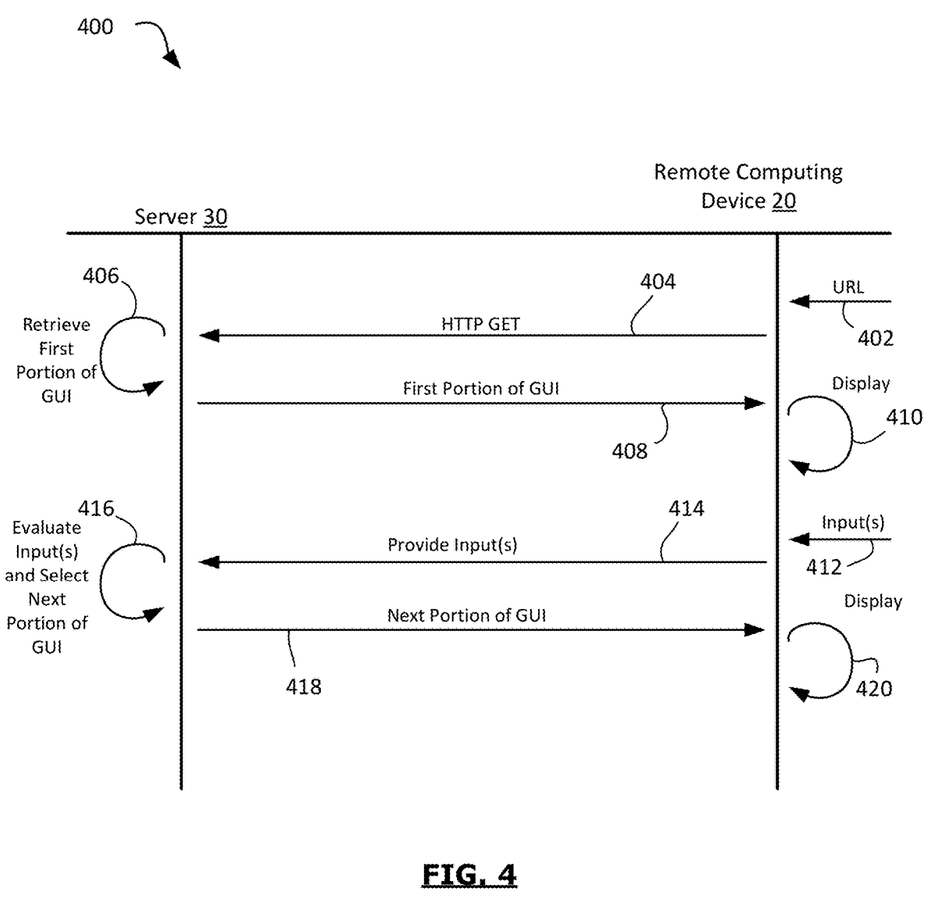
FIG. 4 shows an example signal diagram for communications between a server and a remote computing device to provide a graphical user interface.

Reference is now made to FIG. 4, which is an example signal diagram 400 diagrammatically illustrating signaling or messaging exchanged between the server 30 and the remote computing device 20. The example signal diagram 400 shows receipt, in operation 402, by the remote computing device 20 of an address associated with the server 30, such as a Uniform Resource Locator (URL). The address may, for example, be input into a URL bar associated with a web browser or may be received through selection of a link associated with the address. Then, in operation 404, the remote computing device 20 requests a resource from the server 30. The request may be in the form of an HTTP GET.

In response to receiving the request, the server 30 retrieves a first portion of the GUI (at operation 406) and sends the first portion of the GUI (at operation 408) to the remote computing device 20, which displays the first portion of the GUI at operation 410.

At operation 412, the remote computing device receives one or more inputs through the GUI and sends a message containing the input(s) at operation 414. The server 30 evaluates the input(s) at operation 416 based on eligibility criteria and selects a next portion of the GUI to provide. The next portion of the GUI is either the complex version of the GUI or the non-complex version of the GUI and the selection is made based on the evaluation of the input(s). At operation 418, the server 30 provides the next portion of the GUI to the remote computing device 20 where it is displayed at operation 420.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A server to provide a graphical user interface to a computing device, the server comprising:
a processor;
a communication system coupled to the processor for communicating over a network with the computing device; and
memory coupled to the processor and storing processor-readable instructions that, when executed, cause the processor to:
provide, via the communication system and to the computing device, a first portion of the graphical user interface, the first portion of the graphical user interface including an interface element for receiving input through an input interface associated with the computing device;
receive, via the communication system and from the computing device, input received at the interface element;
determine an eligibility metric based on the input;
compare the eligibility metric to eligibility criteria to determine if a user is likely eligible for a service; and
when it is determined that the user is not likely to be eligible for the service, provide, to the computing device via the communication system, a second portion of the graphical user interface, the second portion of the graphical user interface having an increased abandonment rate of submission and a greater completion complexity than a third portion of the graphical user interface by including at least one false interface element prompting for input that, once received at the computing device, is not sent to the server and disposed of, the third portion of the graphical user interface not including the at least one false interface element and being provided when it is determined that the user is likely to be eligible for the service.

2. The server of claim 1, wherein the second portion of the graphical user interface is configured to disable an auto-completion function on the computing device and wherein the third portion of the graphical user interface is configured to enable the auto-completion function on the computing device.

3. The server of claim 1, wherein the second portion of the graphical user interface includes an interface element for receiving a first type of information and wherein the third portion of the graphical user interface includes an interface element for receiving the first type of information and wherein the interface element of the second portion of the graphical user interface imposes a format restriction that is not enforced by the interface element of the third portion of the graphical user interface.

4. The server of claim 3, wherein the format restriction includes a date formatting restriction that requires an inputted date to accord to a predetermined format.

5. The server of claim 3, wherein the format restriction is a name formatting restriction that requires an inputted name to accord to a predetermined format.

6. The server of claim 1, wherein the second portion of the graphical user interface and the third portion of the graphical user interface include at least some common text and wherein a font size of at least a portion of the common text is different on the second portion of the graphical user interface than on the third portion of the graphical user interface.

7. The server of claim 1, wherein the second portion of the graphical user interface includes text similar in content to text included in the third portion of the graphical user interface but which has a higher word count than the text included in the third portion of the graphical user interface.

8. The server of claim 1, wherein the service includes insurance and wherein determining the eligibility metric includes calculating a score based on the input.

9. The server of claim 1, wherein the processor-readable instructions, when executed, further cause the processor to:
continuously receive the input received at the interface element and perform the steps of determining, comparing and providing each time the input is received.

10. A method of providing a graphical user interface to a computing device, the method comprising:
providing a first portion of the graphical user interface to the computing device, the first portion of the graphical user interface including an interface element for receiving input through an input interface associated with the computing device;
receiving input received at the interface element;
determining an eligibility metric based on the input;
comparing the eligibility metric to eligibility criteria to determine if a user is likely eligible for a service; and
when it is determined that the user is not likely to be eligible for the service, providing, to the computing device, a second portion of the graphical user interface, the second portion of the graphical user interface having an increased abandonment rate of submission and a greater completion complexity than a third portion of the graphical user interface by including at least one false interface element prompting for input that, once received at the computing device, is not sent to the server and disposed of, the third portion of the graphical user interface not including the at least one false interface element and being provided when it is determined that the user is likely to be eligible for the service.

11. The method of claim 10, wherein the second portion of the graphical user interface is configured to disable an auto-completion function on the computing device and wherein the third portion of the graphical user interface is configured to enable the auto-completion function on the computing device.

12. The method of claim 10, wherein the second portion of the graphical user interface includes an interface element for receiving a first type of information and wherein the third portion of the graphical user interface includes an interface element for receiving the first type of information and wherein the interface element of the second portion of the graphical user interface imposes a format restriction that is not enforced by the interface element of the third portion of the graphical user interface.

13. The method of claim 12, wherein the format restriction includes a date formatting restriction that requires an inputted date to accord to a predetermined format.

14. The method of claim 12, wherein the format restriction includes a name formatting restriction that requires an inputted name to accord to a predetermined format.

15. The method of claim 10, wherein the second portion of the graphical user interface and the third portion of the graphical user interface include at least some common text and wherein a font size of at least a portion of the common text is different on the second portion of the graphical user interface than on the third portion of the graphical user interface.

16. The method of claim 10, wherein the second portion of the graphical user interface includes text similar in content to text included in the third portion of the graphical user interface but which has a higher word count than the text included in the third portion of the graphical user interface.

17. The method of claim 10, wherein the service includes insurance and wherein determining the eligibility metric includes calculating a score based on the input.

18. The method of claim 10, further comprising:
continuously receiving the input received at the interface element and perform the steps of determining, comparing and providing each time the input is received.

19. A non-transitory computer readable storage medium comprising processor-executable instructions which, when executed, configure a processor to:
provide a first portion of a graphical user interface to a computing device, the first portion of the graphical user interface including an interface element for receiving input through an input interface associated with the computing device;
receive input received at the interface element;
determine an eligibility metric based on the input;
compare the eligibility metric to eligibility criteria to determine if a user is likely eligible for a service; and
when it is determined that the user is not likely to be eligible for the service, provide, to the computing device, a second portion of the graphical user interface, the second portion of the graphical user interface having an increased abandonment rate of submission and a greater completion complexity than a third portion of the graphical user interface by including at least one false interface element prompting for input that, once received at the computing device, is not sent to the server and disposed of, the third portion of the graphical user interface not including the at least one false interface element and being provided when it is determined that the user is likely to be eligible for the service.

20. The non-transitory computer readable storage medium of claim 19, wherein the processor-readable instructions, when executed, further configure the processor to:
  continuously receive the input received at the interface element and perform the steps of determining, comparing and providing each time the input is received.

* * * * *